United States Patent
Mera et al.

(10) Patent No.: US 7,530,070 B1
(45) Date of Patent: May 5, 2009

(54) DYNAMICALLY CONFIGURABLE ARCHITECTURE FOR MIXED DATA PROCESSING

(75) Inventors: Narciso Mera, Pittstown, NJ (US); John Patrick Sweeney, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 1645 days.

(21) Appl. No.: 09/636,130

(22) Filed: Aug. 10, 2000

(51) Int. Cl.
G06F 9/46 (2006.01)
G06F 15/173 (2006.01)
H04W 4/00 (2006.01)
H04M 1/00 (2006.01)
H04J 3/16 (2006.01)

(52) U.S. Cl. .............. 718/104; 718/102; 709/226; 370/468; 455/464; 455/552.1

(58) Field of Classification Search .......... 718/100, 718/102, 104; 710/8, 110, 41; 709/223–229; 455/560, 450–460, 464, 552.1; 713/1; 379/207.02, 379/322; 712/16, 17, 36, 37; 370/328, 468
See application file for complete search history.

(56) References Cited

U.S. PATENT DOCUMENTS

| | | | | | |
|---|---|---|---|---|---|
| 4,539,637 A | * | 9/1985 | DeBruler | ............... | 719/312 |
| 4,731,817 A | * | 3/1988 | Jonsson et al. | ......... | 379/112.01 |
| 4,823,256 A | * | 4/1989 | Bishop et al. | ................ | 714/10 |
| 5,222,229 A | * | 6/1993 | Fukuda et al. | .............. | 713/375 |
| 5,276,828 A | * | 1/1994 | Dion | ......................... | 709/248 |
| 5,367,678 A | * | 11/1994 | Lee et al. | .................... | 718/104 |
| 5,515,511 A | * | 5/1996 | Nguyen et al. | .............. | 725/117 |
| 5,659,701 A | * | 8/1997 | Amit et al. | ................... | 719/317 |
| 5,867,704 A | * | 2/1999 | Tanaka et al. | ............... | 718/105 |
| 5,951,683 A | * | 9/1999 | Yuuki et al. | .................... | 713/1 |
| 5,999,990 A | * | 12/1999 | Sharrit et al. | .................. | 710/8 |
| 6,061,008 A | * | 5/2000 | Abbey | ........................ | 341/143 |
| 6,067,615 A | * | 5/2000 | Upton | ........................ | 712/37 |
| 6,092,174 A | * | 7/2000 | Roussakov | .................. | 712/15 |
| 6,098,123 A | * | 8/2000 | Olnowich | .................... | 710/41 |
| 6,104,721 A | * | 8/2000 | Hsu | .......................... | 370/431 |
| 6,108,414 A | * | 8/2000 | Ahrndt et al. | ............... | 379/412 |
| 6,295,455 B1 | * | 9/2001 | Fischer et al. | ............ | 455/456.2 |
| 6,330,603 B1 | * | 12/2001 | Seki et al. | .................... | 709/226 |
| 6,363,421 B2 | * | 3/2002 | Barker et al. | ................ | 709/223 |
| 6,381,321 B1 | * | 4/2002 | Brown et al. | ........... | 379/207.02 |
| 6,442,682 B1 | * | 8/2002 | Pothapragada et al. | ......... | 713/1 |
| 6,459,901 B1 | * | 10/2002 | Chawla et al. | ............. | 455/450 |
| 6,493,776 B1 | * | 12/2002 | Courtright et al. | ......... | 710/110 |
| 6,556,548 B1 | * | 4/2003 | Kirkby et al. | .............. | 370/322 |
| 6,578,076 B1 | * | 6/2003 | Putzolu | ..................... | 709/223 |

(Continued)

FOREIGN PATENT DOCUMENTS

EP    WO 99/49623    *    9/1999

Primary Examiner—Meng-Ai An
Assistant Examiner—Jennifer N To
(74) Attorney, Agent, or Firm—Ryan, Mason & Lewis, LLP

(57) ABSTRACT

There is disclosed a communications infrastructure that can be dynamically reconfigured over a wide range of application combinations from being dedicated to one application to any combination of the first application and a second application. The communications infrastructure includes a plurality of processors coupled to a shared bus and a shared system memory. Instructions to implement the first and second function are stored in system memory and available to each processor over the bus.

12 Claims, 2 Drawing Sheets

U.S. PATENT DOCUMENTS

| | | | |
|---|---|---|---|
| 6,631,447 B1 * | 10/2003 | Morioka et al. | 711/141 |
| 6,690,951 B1 * | 2/2004 | Cuffaro et al. | 455/560 |
| 7,085,858 B1 * | 8/2006 | Fox et al. | 710/13 |
| 2001/0003831 A1 * | 6/2001 | Boland | 709/226 |
| 2002/0095565 A1 * | 7/2002 | Nemirovsky et al. | 712/228 |
| 2003/0033411 A1 * | 2/2003 | Kavoori et al. | 709/226 |
| 2006/0039317 A1 * | 2/2006 | Subramanian et al. | 370/328 |

* cited by examiner

DYNAMICALLY CONFIGURABLE ARCHITECTURE FOR MIXED DATA PROCESSING

BACKGROUND OF THE INVENTION

This application relates to telecommunications systems, and in particular to a dynamically configurable architecture for mixed data processing and an associated technique for dynamically allocating telecommunications resources based on demand.

The hardware platform on which communications infrastructure, such as base stations and switch gateways, have traditionally been built includes a mix of microprocessors and digital signal processors. Microprocessors typically serve as system host and data router, performing control-oriented tasks, and interface to multiple DSPs. The DSPs are required to perform signal processing tasks such as speech compression, echo cancellation, fax processing, modem data pump functionality, and error correction. Communications infrastructure equipment must process a number of channels including a variety of data types to support system usage. Each channel or data stream may have unique processing requirements depending on its data type. For example, V.42 bis modem processing is control-processing intensive and places greater burden on the microprocessor than speech compression, which is completely signal processing oriented. Therefore, the ratio of signal processing resources to microprocessor resources is different depending on the channel type.

To process such diverse data streams, one technique has been to dedicate hardware and software resources for each channel or data stream in a communications system. This technique works best where the type of processing required is known a priori and does not change substantially. A typical system using this technique would have dedicated resources for speech data and dedicated resources for other data types.

The shortcoming of the dedicated hardware and software technique is that traffic patterns are not static, therefore resources and cost are not optimized. The number of voice calls versus the number of data calls does not remain constant over the course of time, such as a day. A need exists for a communications infrastructure that is flexible, can handle both signal processing and control processing functions dynamically, under software control and can be dynamically reconfigured to a configuration that corresponds to the demand.

SUMMARY OF THE INVENTION

In accordance with the invention, a communications infrastructure that can be dynamically reconfigured over a wide range of application combinations from being dedicated to one application to any combination of the first application and a second application (or more). The communications infrastructure includes a plurality of processors coupled to a bus and a shared system memory. Each processor can execute control or signal processing functions efficiently, which allows for truly dynamic reconfiguration. Instructions to implement the first and second function are stored in system memory and available to each processor over the bus.

DETAILED DESCRIPTION

Figure 1:
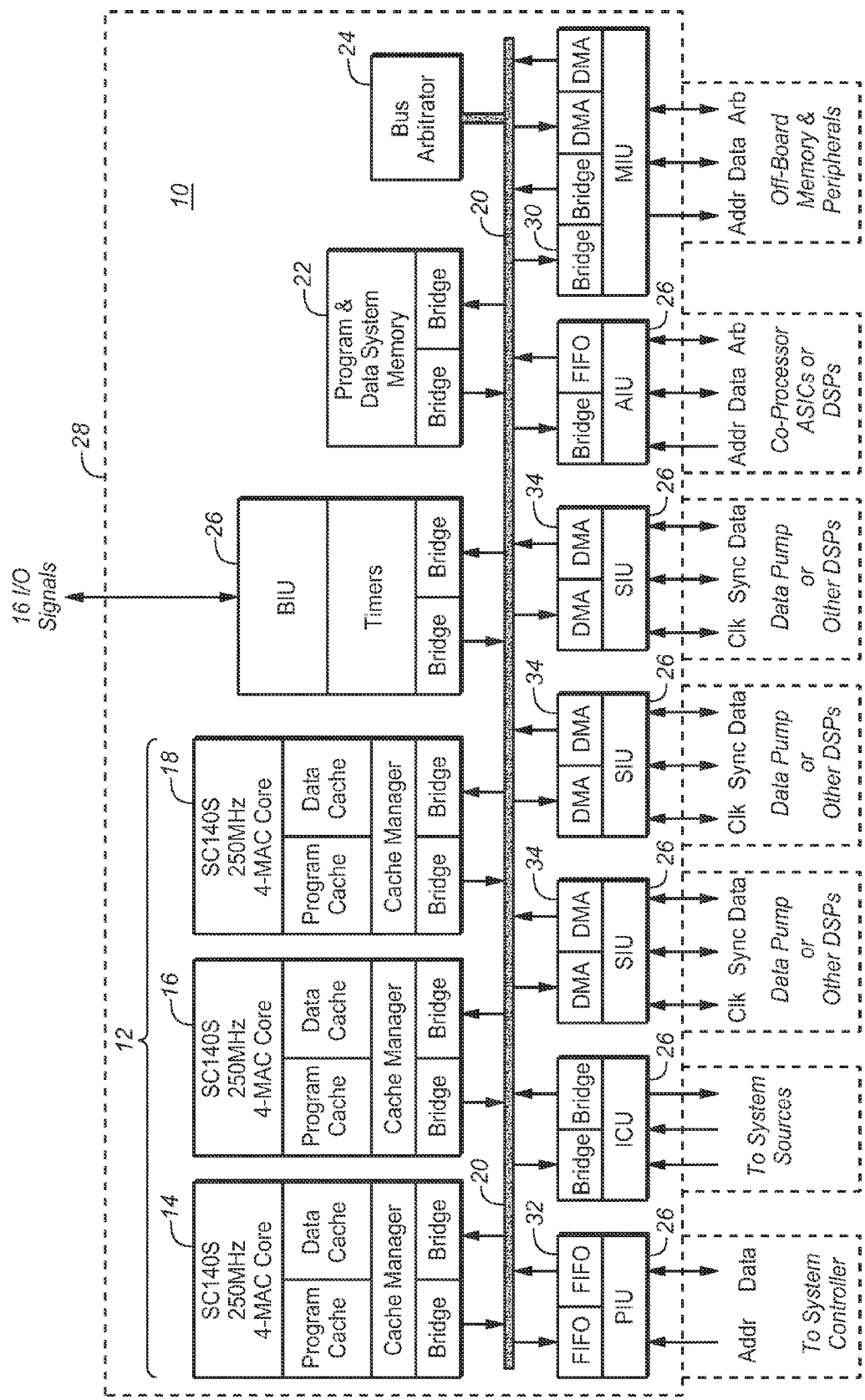
FIG. 1 is a block diagram of a communications infrastructure in accordance with the present invention.

A communications infrastructure 10 that can be dynamically reconfigured over a wide range of application combinations from being dedicated to one application at a first end of a spectrum, to any combination of the first application and a second application, to being dedicated to a second application at the second end of the spectrum is shown in the block diagram of FIG. 1. Communications infrastructure 10 includes a plurality 12 of processors 14, 16 and 18 coupled to bus 20. Also coupled to bus 20 are system memory 22, a bus arbitrator 24 and input/output devices 26. Input/output devices 26 include but are not limited to other peripherals such as an external memory interface unit (MIU) 30, parallel interface unit (PIU) 32, and serial interface unit (SIU) 34. Communications infrastructure 10 may be a portion of a base transceiver station in a cellular telephone system. Communications infrastructure 10 may be fabricated as an integrated circuit 28. Communications infrastructure 10 as illustrated in FIG. 1 includes a plurality 12 of processors 14, 16 and 18. While three processors are illustrated, the invention is not limited thereto. Each of the plurality 12 of processors 14, 16 and 18 is capable of being provided instructions in the form of codes to perform more than one communications task or applications. Which application is performed is dependent upon the instructions provided to and executed by the respective processor. This example will illustrate the dynamic configurability of the processors using two communications tasks or applications. The invention, however, is not limited to two such tasks or applications.

Figure 2:
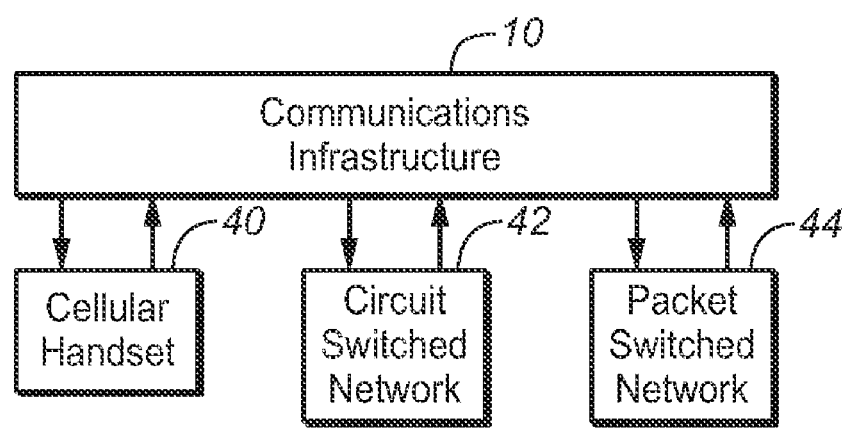
FIG. 2 is a block diagram of an interface of the communications infrastruction of FIG. 1 with various network elements.

Communications infrastructure 10 is capable of processing several calls simultaneously. For example, communications infrastructure 10 may be able to process 64 voice calls. As shown in the block diagram of FIG. 2, these calls may originate and terminate at various sources and destinations such as, cellular handset 40, a circuit switched network 42, or a packet switched network 44.

Two computation intensive applications provided by communications infrastructure 10 include speech coding and modem functions. The speech coding function is required when a voice call received from a cellular handset, for example, is coupled to the circuit switched network 42. Speech coding is carried out by any known speech coding technique. Instructions to carry out the various speech coding techniques are stored in system memory 22. Modem functions may be carried out by any of the modem standards such as V.90 together with any fallback standard.

Rather than having one or more of the plurality 12 of processors dedicated to providing the speech coding function and another one of the plurality 12 of processors combined with an associated microprocessor host dedicated to providing the modem function, communications infrastructure 10 is dynamically configured to allocate sufficient processor resources to the speech coding and modem functions to meet the current level of demand for those functions over the channels processed by communications infrastructure 10, and to route the calls to the appropriate network dynamically. Instructions executed by processors 14, 16 and 18 are configured for speech processing, modem control and data pump functions, or a combination of these two applications on each processor 14, 16 and 18. In a preferred embodiment, processors 14, 16 and 18 are digital signal processors (DSPs), such as 16-bit SC 140 DSP cores each with a dual multiply-accumulate capability, although the invention is not limited thereto. Also preferably, processors 14, 16 and 18 are of an architecture that permits the data and instructions to be stored in a single memory space, although the invention is not limited thereto. Processors 14, 16 and 18 may be homogeneous, that is of the same architecture, or heterogeneous, that is of a different architecture.

Communications infrastructure 10 provides a versatile single hardware platform that can configure on demand to the type of processing required based on the demand for control or signal processing applications as the profile of usage changes. Communications infrastructure 10 achieves the dynamic configuration by storing instructions to perform each of the control and signal processing functions in system memory 22 and transferring instructions over bus 20 to instruction cache memory in one of processors 14, 16 and 18 the instructions to perform a function as increased demand for that function necessitates.

Bus 20 in the illustrated embodiment is a 128-bit wide split-transaction bus, although the invention is not limited thereto. A split-transaction bus exhibits the property that devices coupled to the bus places a request for information on the bus and releases the bus for use by other devices. At a later time, when the requested information is available, the requesting device is notified to receive the previously requested information over/from the bus.

One of the SC 140 cores, also referred to as processors 14, 16 or 18, can optionally execute control code only to provide the control aspect of the modem function for itself, and other DSP cores should they provide modem functions. Each processor core is programmed to know its capacity to handle control and signal processing functions and to know the portion of that capacity that is not utilized. When one of the functions of communications infrastructure 10 or an increased level of a function is required, a hierarchical order of assignment determines which DSP core is designated to undertake the additional processing. The designated DSP core ascertains whether the capacity to perform the additional processing is available. If not the next DSP core in the hierarchical order is designated to undertake the additional processing until a DSP core is identified with processing capacity to undertake the additional processing or the capacity of communications infrastructure 10 is determined to be full. Once a DSP core is identified that can undertake the additional processing, that DSP core requests, from specific memory locations in system memory 22, instructions to perform the function. The instructions are transferred over bus 20 from system memory 22 to an instruction cache in the designated DSP core. Data is buffered until the architecture of communications infrastructure 10 is reconfigured and the instructions to perform the additional processing are transferred to the designated DSP core. The DSP core taking on the additional processing task interleaves the additional processing into its existing workload. The process is repeated to accommodate additional processing tasks up to the capacity limit of communications infrastructure 10. Of course, tasks may be completed thereby reducing the load on one or more DSP cores and making available the unused capacity for subsequent additional processing tasks.

What is claimed is:

1. A method of dynamically configuring telecommunications resources, comprising the steps of:

determining demand for a first telecommunications service, the first telecommunications service comprising a voice service;

allocating first processor resources to perform speech processing functions of the first telecommunications service;

retrieving instructions from a common memory to the first allocated processor resources to perform the speech processing functions of the first telecommunications service;

determining demand for a second telecommunications service, the second telecommunications service comprising a data service;

allocating second processor resources to perform modem control functions of the second telecommunications service; and retrieving instructions from the common memory to the second allocated processor resources to perform the modem control functions of the second telecommunications service;

wherein the step of retrieving instructions from a common memory comprises transferring the instructions over a shared bus coupled to the memory and the first and second processor resources for storage in respective first and second caches of the first and second processor resources;

wherein each of the first and second processor resources is capable of being programmed to perform the first and second telecommunications service;

wherein the steps of allocating first processor resources and allocating second processor resources comprise allocating resources of a plurality of separate processors;

said first and second processor resources comprising respective first and second ones of the plurality of separate processors, said first and second separate processors containing the respective first and second caches;

wherein allocating first processor resources and second processor resources is done in proportion to demand for the first telecommunications service and second telecommunications service, respectively.

2. Communications apparatus, comprising:

a plurality of separate processors, each of the plurality of separate processors capable of being programmed to perform at least a first telecommunications service comprising a voice service and a second telecommunications service comprising a data service;

a shared memory for storing instructions for speech processing functions of the first telecommunications service and modem control functions of the second telecommunications service; and a shared bus coupled to the shared memory and each of the separate processors, the shared bus for transferring instructions from the shared memory to the separate processors as well as for transferring data into and out of the shared memory;

at least first and second ones of the plurality of separate processors comprising respective first and second caches for storing corresponding portions of said instructions and data;

wherein the communications apparatus is fabricated in an integrated circuit.

3. A communications apparatus as recited in claim 2, wherein each of the separate processors is identical.

4. A communications apparatus as recited in claim 2, wherein each of the separate processors is not identical.

5. A communications apparatus as recited in claim 2, wherein the shared memory is a single memory space capable of storing both data and instructions.

6. Communications apparatus, comprising:
- a plurality of separate processors, each of the plurality of separate processors capable of being programmed to perform at least a first telecommunications service comprising a voice service and a second telecommunications service comprising a data service;
- a shared memory for storing instructions for speech processing functions of the first telecommunications service and modem control functions of the second telecommunications service; and
- a shared bus coupled to the shared memory and each of the separate processors, the shared bus for transferring instructions from the shared memory to the separate processors as well as for transferring data into and out of the shared memory;
- at least first and second ones of the plurality of separate processors comprising respective first and second caches for storing corresponding portions of said instructions and data;
- wherein the shared bus is a split-transaction bus.

7. A communications apparatus as recited in claim 6, wherein each of the separate processors is identical.

8. A communications apparatus as recited in claim 6, wherein each of the separate processors is not identical.

9. A communications apparatus as recited in claim 6, wherein the shared memory is a single memory space capable of storing both data and instructions.

10. A communications apparatus, comprising:
- a plurality of separate processors, each of the plurality of separate processors capable of being programmed to perform at least a first telecommunications service comprising a voice service and a second telecommunications service comprising a data service;

a single memory space for storing data and instructions for speech processing functions of the first telecommunications service and modem control functions of the second telecommunications service;
- a split-transaction bus coupled to the memory and each of the separate processors, the split-transaction bus for transferring instructions from the single memory space to the separate processors as well as for transferring data into and out of the single memory space;
- at least first and second ones of the plurality of separate processors comprising respective first and second caches for storing corresponding portions of said instructions and data;
- wherein the communications apparatus is fabricated in an integrated circuit.

11. A communications apparatus, as recited in claim 10, wherein each of the separate processors is identical.

12. A communications apparatus as recited in claim 10, wherein each of the separate processors is not identical.

* * * * *